Aug. 24, 1965  W. G. GREEN  3,202,601
WATER CONDITIONING APPARATUS
Filed Feb. 9, 1962  3 Sheets-Sheet 1
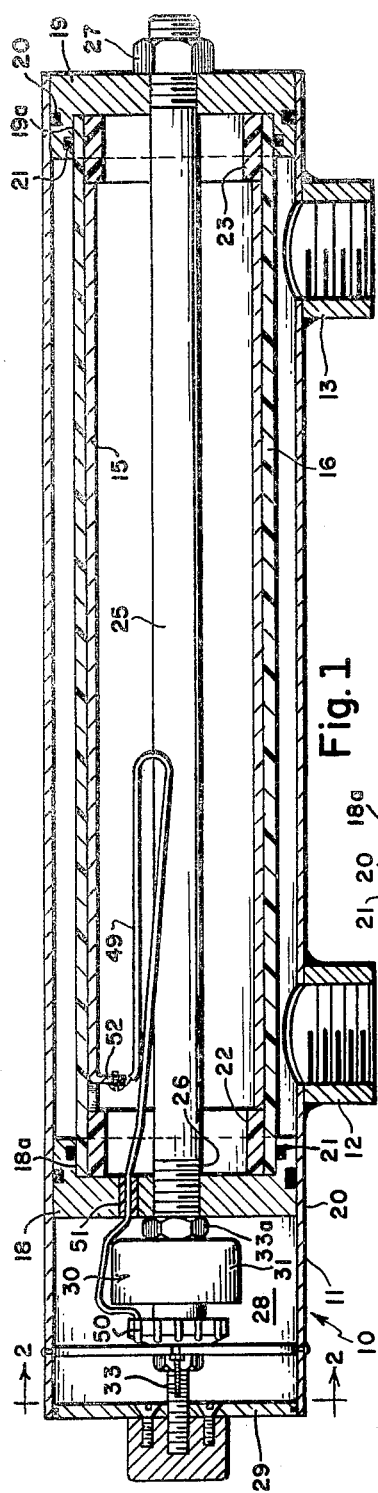
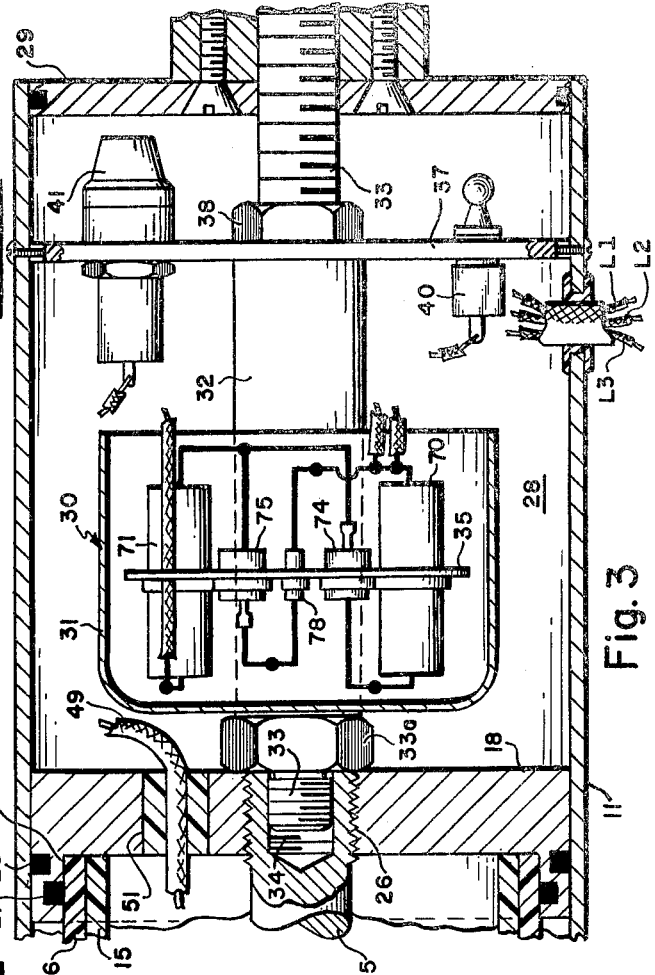
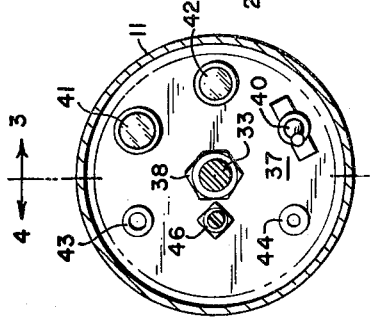
INVENTOR.
WILLIAM G. GREEN
BY *Roy E. Raney*
ATTORNEY

United States Patent Office 3,202,601
Patented Aug. 24, 1965

3,202,601
WATER CONDITIONING APPARATUS
William G. Green, St. Petersburg, Fla., assignor, by mesne assignments, to Aquatron Engineering Corp., St. Petersburg, Fla., a corporation of Florida
Filed Feb. 9, 1962, Ser. No. 172,236
1 Claim. (Cl. 204—302)

This application in a continuation-in-part of my copending patent application Serial No. 739,182, filed June 2, 1958, and now abandoned.

This invention relates to improvements in water conditioning methods and apparatus for electrically treating impure water so as to render it more suitable for domestic and industrial uses. More particularly, the invention is directed to an improved method and apparatus for subjecting water to an electrostatic field so as to render innocuous certain dissolved impurities such as mineral salts by reducing their ability to form crystalline structures resulting in scale deposits, sludge, and encrustations in systems through which the water flows, such as boilers, air conditioning cooling towers, and the like, as well as increasing the wetting properties of the water making it more suitable for use in laundries.

It is a primary object of this invention to provide an improved means and method for conditioning mineral laden water by subjecting the water to a substantially constant electrostatic field while providing the water with a source of electrons and preventing any flow of electrolizing current therethrough.

It is another object of this invention to provide a water treatment apparatus comprising a pair of spaced, electrically conductive members adapted to have an electrical potential impressed therebetween, and dielectric means cooperating with one of the conductive members to define a passage for the water to be treated while keeping the water free of contact with the other of the conductive members, whereby water in the passage is subjected to an electrostatic field between the conductive members.

Another object of this invention is the provision of water treatment apparatus of the foregoing character wherein the conductive members are in the form of an outer shell and a coaxial cylinder member therein, the outer shell being grounded and the inner cylinder member being encased in an electrically insulating sleeve, the members being charged by power supply means for converting alternating current, such as the usual 115 v. A.C. household current, to a constant or direct current electrical potential applied to the conductive members so as to establish a constant potential difference therebetween, resulting in a desired electrostatic field permeating water in the passage therebetween.

Another object of this invention is the provision of an improved water treatment apparatus wherein the electric power supply means is mounted within the grounded outer shell thereby providing a particularly compact, self-protecting, and electrically shielded apparatus.

Other objects and advantages of the present invention will become apparent from the following detailed description of a presently preferred embodiment thereof described in conjunction with the accompanying sheets of drawings forming a part of this specification, and in which, FIG. 1 is a longitudinal sectional view of an electrostatic water conditioning apparatus embodying this invention;

FIG. 2 is a sectional view taken along line 2—2 of FIG. 1;

FIG. 3 is an enlarged fragmentary sectional view taken substantially along line 3—3 of FIG. 2;

Figure 4:
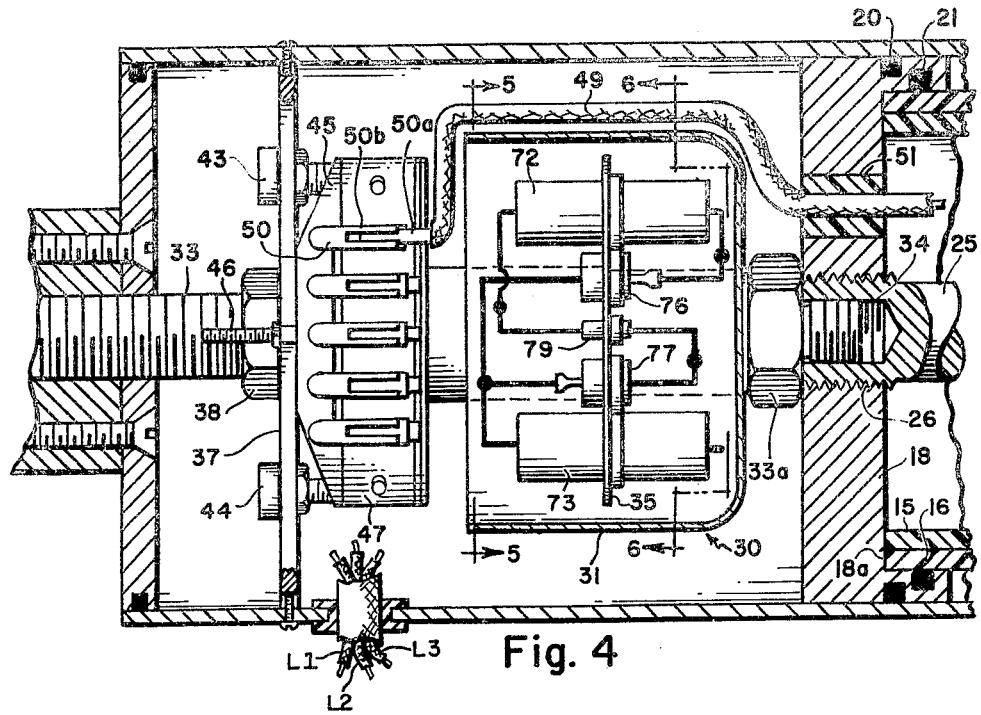
FIG. 4 is an enlarged fragmentary sectional view taken along line 4—4 of FIG. 2.
Figures 5, 6:
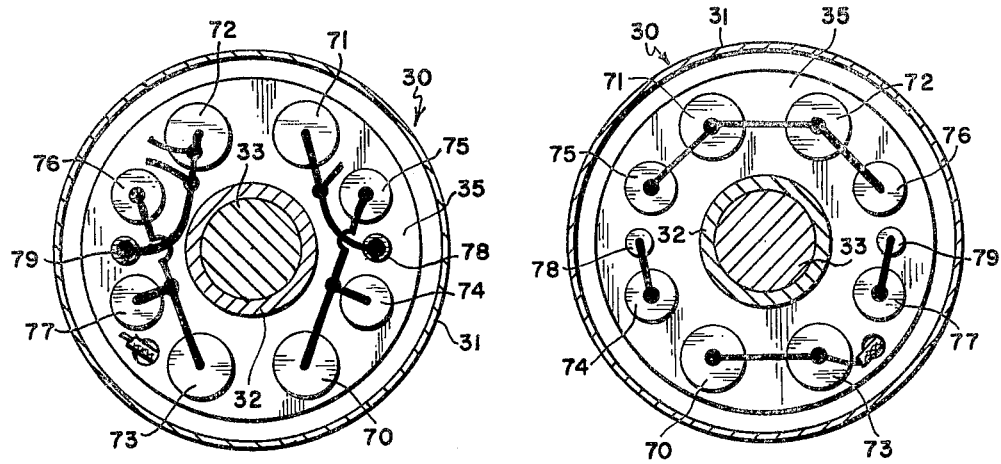
FIG. 5 is a fragmentary sectional view taken along line 5—5 of FIG. 3.
FIG. 6 is a sectional view taken along line 6—6 of FIG. 3.

While the method of water conditioning contemplated by this invention may be practiced through the use of other apparatus embodying the invention, a preferred embodiment is described hereinafter as an example thereof.

In the form of the invention shown in the drawings, there is provided an electrostatic water conditioning apparatus 10 comprising a tubular metal shell 11 having water inlet and outlet connections 12 and 13 respectively. Shell 11 may be made of any suitable metallic conductor such as aluminum, Monel metal, steel, and the like, but is conveniently made of aluminum. Contained within shell 11 is a metallic cylinder 15 which is disposed within a sleeve 16 of electrically insulating dielectric and water impermeable material such as polyvinylchloride plastic.

Cylinder 15 and sleeve 16 are supported in coaxial spaced relation to cylinder 11 by annular support members 18 and 19 which are pressed into shell 11 and have recesses 18a and 19a receiving the ends of sleeve 16. Support members 18 and 19 are conveniently formed of aluminum and are provided with sealing means such as O-rings 20 and 21 for making a fluid tight seal between the support members and shell 11 and sleeve 16 respectively. Metal cylinder 15 is substantially shorter than sleeve 16 and is held in spaced relation to the support members 18 and 19 by annular spacer rings 22 and 23 which are formed of electrically insulating, water impermeable material.

Insulating sleeve 16 and shell 11 define an annular passage for the flow of water from inlet 12 to outlet 13, the flow path lying between shell 11 and cylinder 14 with the sleeve 16 preventing direct contact of the water with the cylinder 15.

A rod 25 extends through support members 18 and 19 and is provided with a thread 26 engaging member 18 and a nut 27 which serves to draw the support members together in clamping relation to the insulating sleeve 16, spacer members 22 and 23, and cylinder member 15. Support member 18 is set into shell 11 so as to define a chamber 28 in one end thereof. Chamber 28, which is closed by a closure member 29, contains an electric power supply means, generally indicated at 30, for maintaining a substantially constant electrostatic potential between cylinder 15 and shell 11.

Power supply means 30 comprises a cup-shaped housing 31 formed of sheet metal, or the like, and surrounding a central tube 32 carried on a stud 33 which is threadedly engaged in a bore 34 in the end of rod 25, as is best shown in FIG. 4. Stud 33 conveniently is provided with a portion having flats 33a for engagement by a suitable wrench. An annular chassis 35 is mounted on tube 32 within cup 31 and serves to support a plurality of electrical components described more fully hereinafter. Preferably, cup 31 is filled with a suitable wax or pitch poured around the electrical components therein to positively seal them against moisture and insulation breakdown. A circular panel 37 is mounted on stud 33 between tube 32 and a nut 38 and serves to support other electrical components such as a switch 40, a pilot light 41, a fuse 42, and electrical connection jacks 43 and 44 as is best shown in FIG. 2.

A bracket 45 is mounted on the underside of panel 37 by screw 46 and carries a conventional terminal strip 47 having a plurality of tie points in the form of connector means 48 having lugs to which wires from various components may be soldered, and sockets in which pins on other wires may be removably inserted. Thus, a wire 49 has a pin 50a engaged in a socket 50b of a connector 50 on terminal strip 47. Wire 49 leads through an insulator bushing 51 in support member 18 and has its other end connected to a tongue 52, struck out of cylinder 15. The other wires leading from terminal strip 47 have been omitted from FIGS. 1, 2, and 3 in the interest of clarity, since this strip may be used in a conventional manner to aid in connecting switch 40, light, 41, fuse 42, etc. to the electrical components in cup 31, in accordance with the circuit of FIG. 7, described more fully hereinafter.

Figure 7:
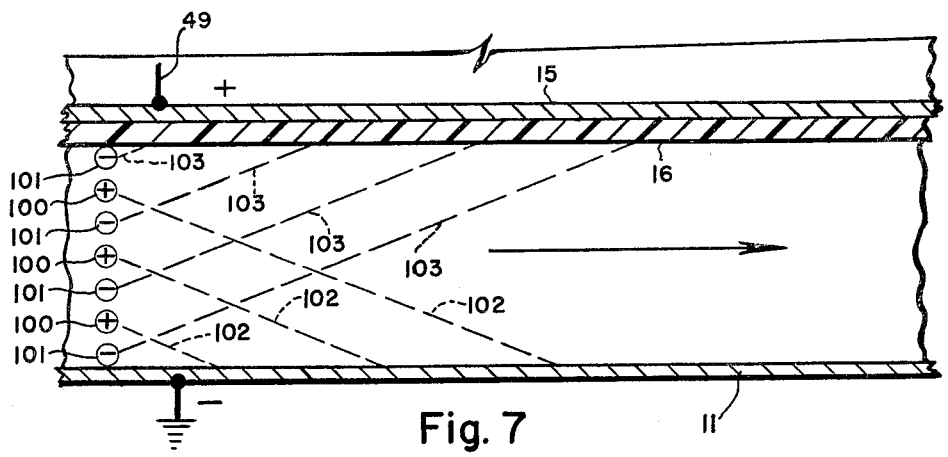
FIG. 7 is a view schematically illustrating the electrical power supply circuit of this apparatus.

Referring now to FIG. 7, there is illustrated therein the wiring diagram of a power supply circuit for charging the shell 11 and cylinder 15 with electrical power for maintaining a predetermined electrical potential difference therebetween. The power supply circuit of FIG. 7 is adaptable to use with household currents which, in this instance, may be either 230 v. A.C. or 115 v. A.C. The circuit is provided with a conventional connector plug 60 having three conductors L1, L2, and L3 extending therefrom. Assuming the apparatus to be connected to 115 v. A.C. across lines L1 and L2 only, a circuit may be traced from line L1 through wire 61 from a connector 62, switch 40, fuse 42 an anti-surge resistor 63, and a wire 64 to terminal 65 of a conventional voltage multiplier indicated generally at 66. From terminal 67 of voltage multiplier 66 a wire 68 completes the circuit to grounded line L2.

Voltage multiplier 66, which in this case is a quadrupler, comprises condensers 70, 71, 72, and 73, rectifiers 74, 75, 76, and 77, and resistors 78 and 79 all arranged in a conventional manner to form the voltage multiplier network 66 with the increased voltage appearing between terminals 67 and 80 thereof. This voltage, on the order of 450 v. D.C., is applied to cylinder 15 via wires 81 and 82, jack 43, a resistor 83, jack 44, and previously mentioned connector 50, and wire 49. Terminal 67 is connected by wire 68 to ground which is preferably accomplished by connection either directly or indirectly to shell 11 which is grounded by connection to the water system employing the apparatus. In the present embodiment the rectifiers 74, 75, 76, and 77 are oriented to make the cylinder 15 positively charged with respect to shell 11 which, as has just been mentioned, is grounded. Neon pilot light 41 is connected in series with a dropping resistor 87 between connector 84 and ground, as shown. Pilot light 41 will indicate the application of the electric charge to cylinder 15.

In order to reduce the ripple voltage and radio interference possibly caused thereby, a filter network comprising a resistor 88 and a condenser 89, is connected between wires 68 and 81 of the voltage multiplier network. In some instances it is desirable to include a second pilot light 90, connected in series with a dropping resistor 91 between wire 64 and ground, so as to light whenever switch 40 is closed. In addition, voltage measuring means in the form of a resistor 93 in series with a sensitive ammeter 94 is connected between connector 84 and ground and serves to indicate the amount of charge or potential established between cylinder 15 and shell 11.

When it is desired to operate the apparatus from a 230 v. A.C. three wire source, wire 61 is removed from connector 62 and re-connected by connector 96 and a dropping resistor 97 to switch 40. Line L3 is connected by a dropping resistor 98 to terminal 67 of voltage multiplier 66. Resistors 97 and 98 are so chosen that the D.C. voltage established between wires 68 and 81 will be substantially the same as that which was established when 115 v. current was used between lines L1 and L2 only.

In the present example, resistors 98, 78, 79 are 22K (where $K=1,000$ ohms), resistor 97 is 47K, resistor 83 is 220K, resistor 87 is 20 megohms, resistor 93 is 10 megohms, resistor 91 is 68K, resistor 88 is 22 megohms, and resistor 63 is 10K. Capacitors 70, 71, 72, and 73, are 0.1 mfd., and capacitor 89 is .05 mfd. The meter 41 is a 0–100 microammeter. Rectifiers 74, 75, 76, and 77 are type number SD 500–90, and pilot lights 41 and 90 are type NE–51.

The operation of the apparatus 10 will now be described, assuming that inlet and outlet connections 12 and 13 are connected to pipes or conduits so that the apparatus 10 is in series with a system containing water to be treated, and that connector 60 is connected with a suitable source of electricity so that power supply means 30 establishes an electrical potential of approximately 450 v. D.C. between cylinder 15 and shell 11.

Figure 8:
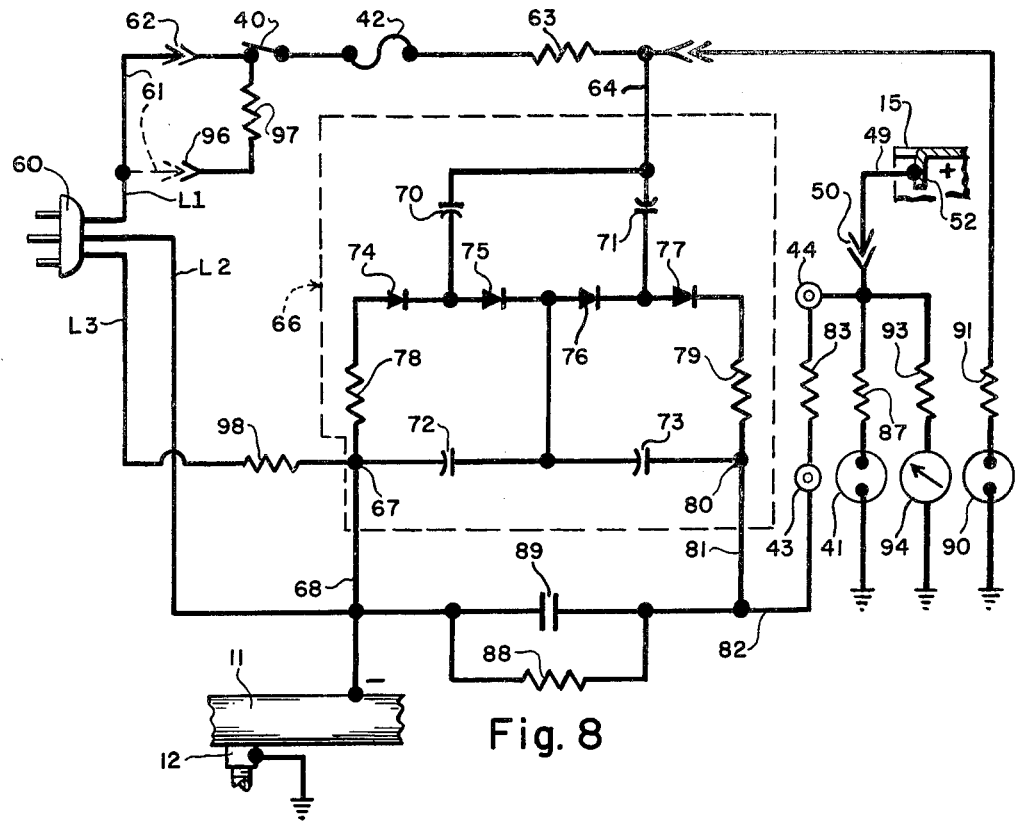
FIG. 8 is a schematic illustration of the operation of the apparatus.

Referring to the schematic illustration of FIG. 8, the flow of water between shell 11 and insulating sleeve 16 is from left to right and contains positively charged mineral ions 100 and negatively charged mineral ions 101. These ions result from the disassociation of ions which were present in mineral salts such as calcium carbonate, and the like which were dissolved in the water and which would tend to form crystalline structures such as limestone scale in the water containing system in the absence of conditioning of the water by the apparatus of this invention. It will be appreciated that the negatively charged ions have an excess of electrons while the positively charged ions are characterized by a deficiency in electrons, and that an electrostatic field, such as that induced between cylinder 15 and shell 11 will cause the positive ions 100 to migrate toward the negatively charged member and the negatively charged ions 101 to migrate toward the positively charged member.

Recalling that cylinder member 15 carries a positive charge of approximately 450 v. with respect to the shell 11, and that the latter is grounded by means of connecting water pipes, it will be appreciated that shell 11 is thereby provided with a supply of electrons and that the shell will accumulate an excess of electrons corresponding to the positive charge of cylinder 15. With the water moving from left to right as viewed in FIG. 8, the positive ions 100 which are attracted toward the negatively charged shell 11 describe paths 102, while negatively charged ions 101 will be attracted toward the positively charged cylinder member 15 and describe paths 103. Since insulating sleeve 16 is water impermeable and prevents any direct contact of the water or water borne ions with the positively charged cylinder 15, there will be no transfer of electrons thereto and hence no actual flow of electric current will exist through the water being conditioned, nor will there be any actual current flow between cylinder member 15 and shell 11. The ionic movement induced by the electrostatic field apparently brings the ions into association with one another which inhibit the formation of crystalline structures. Also, the inhibition to form crystals may be explained in part by assuming that the positively charged ions which are brought into contact with shell 11 pick up free electrons therefrom, thereby neutralizing these ions and preventing them from being attracted to negatively charged ions so as to form crystalline scale.

Because there is no current flow between shell 11 and cylinder member 15, no electrolysis of the water occurs and no metallic ions are either passed into the water from shell 11 or plated out of the water onto shell 11. Moreover, no gases such as oxygen or hydrogen are evolved during the conditioning process.

The apparatus 10 is, in effect, a large electrical condenser, or capacitor in which the plates are comprised of shell 11 and cylinder member 15, which would dissipate large quantities of electric power if alternating current were applied thereacross, with the power consumption increasing in proportion to increases in alternating current frequency. In accordance with the present invention, however, the application of a constant or D.C. potential between shell 11 and cylinder member 15 results in a substantially constant electrostatic field drawing substantially zero current.

Extensive tests have been run with the apparatus 10 connected in household water systems and in commercial water systems such as air conditioning cooling towers and laundry water supplies. In these installations there has been observed a marked absence of accumulations of limestone and other scale and encrustations as well as an actual reduction or dissolving of previously deposited scales. Moreover, there has been observed a notable increase in the wetting power of the water making it more suitable for use in laundries in that it results in a minimum formation of soap scum.

While the foregoing analysis of the operation of the water conditioning means embodying this invention represents my present interpretation of the electrical forces and ionic effects involved, it will be understood that the improved results which I have observed in actual practice of the invention have been achieved by the above described constructions and arrangements of the parts, and a complete understanding of the forces and ionic effects involved is not necessary to practice the invention.

From the foregoing detailed description of my water conditioning method and apparatus embodying the invention, it will be appreciated that there has been provided thereby particularly effective improvements in the art of water conditioning, which improvements serve to effectively oppose the formation of crystalline sludge and scale in the form of deposits in water systems in which water, carrying dissolved minerals, circulates. It will also be appreciated that the apparatus embodying this invention is simple of construction and may be operated for a long period of time with a minimum of power consumption and maintenance.

Although the invention has been described with reference to a specific method and electrostatic water conditioning apparatus for practicing the method, it will be understood that the invention is not limited thereto, but rather the invention includes all those modifications, adaptations, and uses as are embraced by the scope of the claim hereof.

Having thus described my invention, I claim.

A water treatment apparatus for subjecting water to a constant electrostatic field, said apparatus comprising:
(a) a tubular metal shell having axially spaced inlet and outlet connections,
(b) first and second support members disposed in said shell with said inlet and outlet connections therebetween,
(c) a sleeve of water impermeable dielectric insulating material concentrically disposed in said shell and having its opposite ends held by said first and second support members in spaced relation to the inner surface of said shell so as to define therein a passageway for water flow from said inlet to said outlet,
(d) a cylindrical electrode disposed in said sleeve so as to be fully electrically insulated from said shell and from said water,
(e) tie rod means extending through said support members and through said electrode and sleeve so as to clamp said sleeve between said support members,
(f) one of said support members being disposed inwardly of the adjacent end of said shell so as to define a recess therein in which one end of said rod terminates,
(g) a power supply mounted in said recess on said one end of said rod, said power supply comprising a voltage multiplier rectifier network, the components of which are sealed in a cup surrounding a stud secured to said rod,
(h) a disc-like panel mounted on said stud in said recess,
(i) control switch and indicating means mounted on said panel, and
(j) a closure member for said recess, said closure member being engaged in said end of said shell and removably secured to said stud,
(k) said power supply having a line cord for connection to a source of alternating current, and having high voltage, direct current output leads connected to said shell and said cylindrical electrode, respectively.

References Cited by the Examiner

FOREIGN PATENTS

| | | |
|---|---|---|
| 601,576 | 5/48 | Great Britain. |
| 601,578 | 5/48 | Great Britain. |
| 601,579 | 5/48 | Great Britain. |
| 601,580 | 5/48 | Great Britain. |
| 606,154 | 8/48 | Great Britain. |
| 652,967 | 5/51 | Great Britain. |

JOHN H. MACK, *Primary Examiner.*
JOSEPH REBOLD, *Examiner.*